United States Patent
Zhang et al.

(10) Patent No.: US 12,512,674 B2
(45) Date of Patent: Dec. 30, 2025

(54) ENERGY STORAGE CIRCUIT AND CONTROL METHOD THEREOF

(71) Applicant: FranklinWH Energy Storage Inc., San Jose, CA (US)

(72) Inventors: Chi Zhang, Shenzhen (CN); Jiansheng Chen, Shenzhen (CN); Song Chen, Shenzhen (CN); Gang Xiao, Shenzhen (CN)

(73) Assignee: Franklin WH Energy Storage Inc., San Jose, CA (US)

( * ) Notice: Subject to any disclaimer, the term of this patent is extended or adjusted under 35 U.S.C. 154(b) by 198 days.

(21) Appl. No.: 18/405,753

(22) Filed: Jan. 5, 2024

(65) Prior Publication Data
US 2025/0226661 A1 Jul. 10, 2025

(51) Int. Cl.
| | |
|---|---|
| H02J 3/32 | (2006.01) |
| H02J 3/00 | (2006.01) |
| H02J 7/00 | (2006.01) |
| H02M 1/00 | (2006.01) |
| H02M 3/156 | (2006.01) |

(52) U.S. Cl.
CPC ............. *H02J 3/32* (2013.01); *H02J 3/0012* (2020.01); *H02J 7/007182* (2020.01); *H02M 1/0009* (2021.05); *H02M 3/156* (2013.01); H02J 2207/20 (2020.01)

(58) Field of Classification Search
CPC ...... H02J 3/32; H02J 3/0012; H02J 7/007182; H02M 1/0009; H02M 3/156
See application file for complete search history.

(56) References Cited

U.S. PATENT DOCUMENTS

2015/0124489 A1* 5/2015 Dai ........................ H02M 3/335 363/17
2022/0045618 A1* 2/2022 Kumar .................... H02J 7/007

* cited by examiner

*Primary Examiner* — Adolf D Berhane
*Assistant Examiner* — Afework S Demisse
(74) *Attorney, Agent, or Firm* — ANOVA LAW GROUP, PLLC

(57) ABSTRACT

The present disclosure provides an energy storage circuit, and a control method. The energy storage circuit includes a DC/DC circuit including a primary side and a secondary side which are connected through a transformer; at least one AC/DC circuit electrically connected between the DC/DC circuit and an electrical grid; a third grid voltage detector configured to measure a grid voltage and detect an on-grid state or an off-grid state; a grid power relay; and a processor. In response to the on-grid state being detected and a grid voltage being detected abnormal, the processor is configured to turn off the grid power relay for disconnection and generate waves using a dual active bridge (DAB) topology mode; and in response to the off-grid state being detected and the grid voltage being detected normal, the processor is configured to determine whether the primary-side voltage is matched with the secondary-side voltage.

20 Claims, 6 Drawing Sheets

ENERGY STORAGE CIRCUIT AND CONTROL METHOD THEREOF

FIELD OF THE DISCLOSURE

The present disclosure generally relates to the field of energy storage technology and, more particularly, relates to an energy storage circuit and a control method thereof.

BACKGROUND

With rapid development of power electronics technology and awareness of the global energy crisis, the power conversion technology in the field of household energy storage has developed rapidly; and higher requirements have been put forward for operating efficiency and reliability of power conversion apparatuses.

A power circuit of an energy storage system includes an AC (alternating current)/DC (direct current) rectifier circuit and a DC/DC isolation charging circuit. Users pay more attention to cycle charge/discharge efficiency and off-grid loading characteristics of the energy storage system. The cycle charge/discharge efficiency may be mainly configured in on-grid operation, and off-grid loading characteristics may be configured in the off-grid operation scenario.

BRIEF SUMMARY OF THE DISCLOSURE

One aspect of the present disclosure provides an energy storage circuit. The energy storage circuit includes a DC/DC circuit, including a primary side and a secondary side which are connected through a transformer, where the primary side of the DC/DC circuit includes a first voltage detector configured to measure a primary-side voltage; and the secondary side of the DC/DC circuit includes a first resonant capacitor, a power inductor, a first switch crossing the first resonant capacitor, a second switch crossing the power inductor and a third switch connected in series with the power inductor, and a second voltage detector configured to measure a secondary-side voltage; at least one AC/DC circuit electrically connected between the DC/DC circuit and an electrical grid; a third grid voltage detector configured to measure a grid voltage and detect an on-grid state or an off-grid state; a grid power relay; and a processor. In response to the on-grid state being detected and the grid voltage being detected abnormal, the processor is configured to turn off the grid power relay for disconnection and generate waves using a dual active bridge (DAB) topology mode; and in response to the off-grid state being detected and the grid voltage being detected normal, the processor is configured to determine whether the primary-side voltage is matched with the secondary-side voltage.

Another aspect of the present disclosure provides an energy storage circuit. The energy storage circuit includes a DC/DC circuit, including a primary side and a secondary side which are connected through a transformer, where the primary side of the DC/DC circuit includes a first voltage detector configured to measure a primary-side voltage; and the secondary side of the DC/DC circuit includes a first resonant capacitor, a power inductor, a first switch crossing the first resonant capacitor, a second switch crossing the power inductor, and a second voltage detector configured to measure a secondary-side voltage; at least one AC/DC circuit electrically connected to the DC/DC circuit; a grid power relay; and a processor. In response to an on-grid state being detected, the processor is configured to turn on the first switch for conduction and turn off the second switch for disconnection and generate waves using a dual active bridge (DAB) topology mode; and in response to an off-grid state being detected, the processor is configured to turn off the first switch for disconnection and turn on the second switch for conduction and generate waves using a resonant topology mode.

Another aspect of the present disclosure provides a control method of an energy storage circuit, where the energy storage circuit includes a DC/DC circuit, including a primary side and a secondary side which are connected through a transformer, where the primary side of the DC/DC circuit includes a first voltage detector configured to measure a primary-side voltage; and the secondary side of the DC/DC circuit includes a first resonant capacitor, a power inductor, a first switch crossing the first resonant capacitor, a second switch crossing the power inductor and a third switch connected in series with the power inductor, and a second voltage detector configured to measure a secondary-side voltage; at least one AC/DC circuit electrically connected between the DC/DC circuit and an electrical grid; a third grid voltage detector configured to measure a grid voltage and detect an on-grid state or an off-grid state; a grid power relay; and a processor. The method includes in response to the on-grid state being detected and the grid voltage being detected abnormal, turning off the grid power relay for disconnection and generating waves using a dual active bridge (DAB) topology mode; and in response to the off-grid state being detected and the grid voltage being detected normal, determining whether the primary-side voltage is matched with the secondary-side voltage.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description of the drawings to explain the principles of the present disclosure.

DETAILED DESCRIPTION

References may be made in detail to exemplary embodiments of the disclosure, which may be illustrated in the accompanying drawings. Wherever possible, same reference numbers may be used throughout the accompanying drawings to refer to same or similar parts.

With rapid development of power electronics technology and awareness of the global energy crisis, the power conversion technology in the field of household energy storage has developed rapidly; and higher requirements have been put forward for the operating efficiency and reliability of power conversion apparatuses. A power circuit of an energy storage system includes an AC (alternating current)/DC (direct current) rectifier circuit and a DC/DC isolation charging circuit. Users pay more attention to the cycle charge/discharge efficiency and the off-grid loading characteristics of the energy storage system. The cycle charge/discharge efficiency may be mainly reflected in on-grid operation, and off-grid loading characteristics may be reflected in the off-grid operation scenario.

Figure 1:
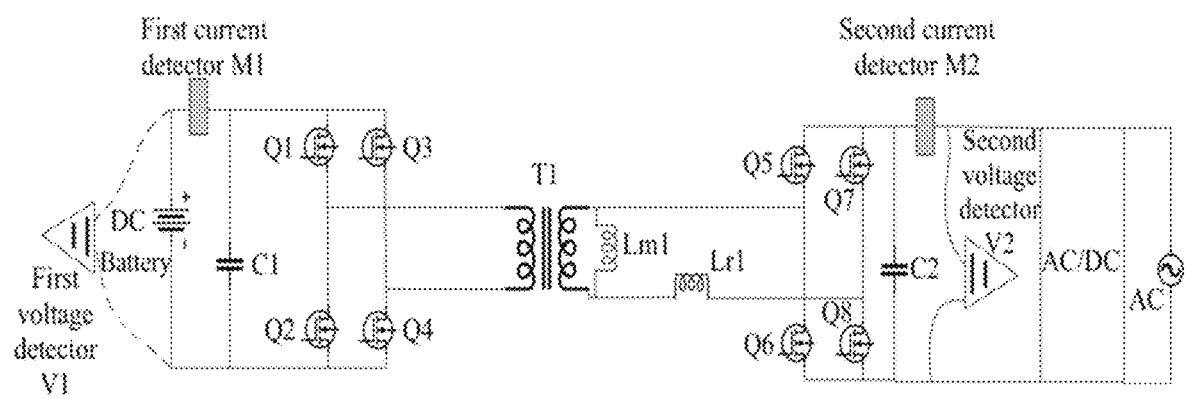
FIG. 1 depicts an exemplary energy storage circuit with a dual active bridge (DAB) topology.

In order to improve the off-grid loading characteristics of the energy storage system (i.e., energy storage apparatus), one-level AC/DC rectifier circuit may be used; and a dual active bridge (DAB) topology with faster response speed may be configured on the side of the DC/DC isolation charging circuit, as shown in FIG. 1.

The DAB topology may be configured for off-grid apparatuses. The DAB topology may be an isolated topology which may be divided into a primary side and a secondary side. Exemplarily, as shown in FIG. 1, the primary side may include a plurality of power semiconductor devices (e.g., metal-oxide-semiconductor field-effect transistors MOSFETs) including the first power semiconductor device Q1, the second power semiconductor device Q2, the third power semiconductor device Q3 and the fourth power semiconductor device Q4; and include the first current detector M1, the first voltage detector V1, and the first (e.g., primary-side) capacitor C1. Exemplarily, as shown in FIG. 1, the secondary side may include a plurality of power semiconductor devices (e.g., MOSFETs) including the fifth power semiconductor device Q5, the sixth power semiconductor device Q6, the seventh power semiconductor device Q7 and the eighth power semiconductor device Q8; and include a resonant inductor Lr1, the second (e.g., output) capacitor C2, the second current detector M2, and the second voltage detector V2. The primary and secondary sides may be connected by a (power) transformer T1. In one embodiment, the transformer T1 may have an excitation inductor. In other embodiments, the excitation inductor (e.g., the excitation inductor Lm1 in FIG. 1) may be optionally included and configured in parallel with the transformer T1.

Exemplarily, the drain electrode of the first power semiconductor device Q1 may be electrically connected to the positive electrode (e.g., potential) of the first capacitor C1, the source electrode of the first power semiconductor device Q1 may be electrically connected to the drain electrode of the second power semiconductor device Q2 in series, and the source electrode of the second power semiconductor device Q2 may be connected to the negative electrode of the first capacitor C1. Exemplarily, the drain electrode of the third power semiconductor device Q3 may be electrically connected to the positive electrode of the first capacitor C1, the source electrode of the third power semiconductor device Q3 may be electrically connected to the drain electrode of the fourth power semiconductor device Q4 in series, and the source electrode of the fourth power semiconductor device Q4 may be electrically connected to the negative electrode of the first capacitor C1.

Exemplarily, two taps on the primary side of the transformer may be electrically connected to the series connection point of the first power semiconductor device Q1 and the second power semiconductor device Q2, and to the series connection point of the third power semiconductor device Q3 and the fourth power semiconductor device Q4, respectively.

Exemplarily, the drain electrode of the fifth power semiconductor device Q5 may be electrically connected to the positive electrode of the second capacitor C2, the source electrode of the fifth power semiconductor device Q5 may be electrically connected to the drain electrode of the sixth power semiconductor device Q6 in series, and the source electrode of the sixth power semiconductor device Q6 may be electrically connected to the negative electrode of the second capacitor C2. Exemplarily, the drain electrode of the seventh power semiconductor device Q7 may be electrically connected to the positive terminal of the second capacitor C2, the source electrode of the seventh power semiconductor device Q7 may be electrically connected to the drain electrode of the eighth power semiconductor device Q8 in series, and the source electrode of the eighth power semiconductor device Q8 may be electrically connected to the negative electrode of the second capacitor C2.

Exemplarily, two taps on the secondary side of the transformer may be electrically connected to the series connection point of the fifth power semiconductor device Q5 and the sixth power semiconductor device Q6, and to the series connection point of the seventh power semiconductor device Q7 and the eighth power semiconductor device Q8, respectively.

According to embodiments of the present disclosure, it should be noted that a gate electrode of any one of above-mentioned power semiconductor devices may be connected to a driving circuit. Exemplarily, the driving circuit may be a driver, a driving optocoupler, a driving transformer or the like.

In some embodiments, a power inductor may be electrically connected in series with a primary-side circuit or connected in series with a secondary-side circuit. In other embodiments, the power inductor may be integrated within the transformer T1 (e.g., using a magnetic apparatus). In such scenario, the leakage inductor of the transformer may be used as the power inductor.

Figure 2:
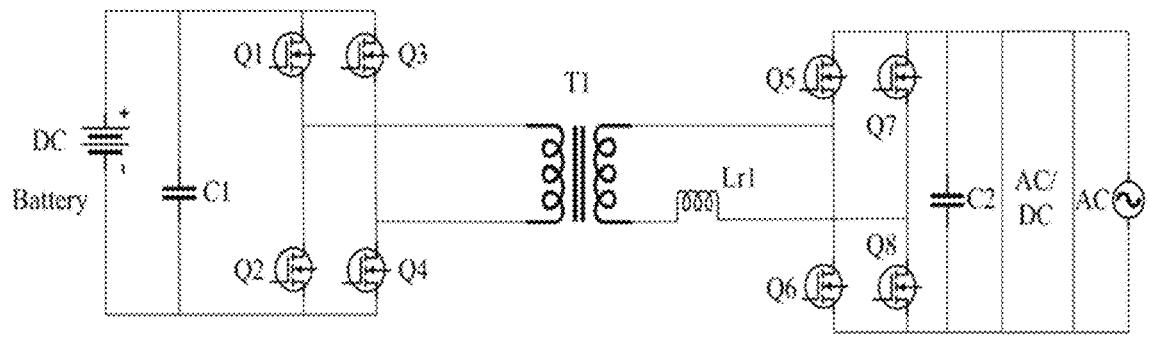
FIG. 2 depicts another exemplary energy storage circuit with a DAB topology.

FIG. 2 depicts another exemplary energy storage circuit with a DAB topology. Referring to FIG. 2, in some embodiment, an excitation inductor may be included, and the transformer T1 may have an excitation inductor. Specific description of the DAB topology in FIG. 2 may refer to detailed description of the DAB topology in FIG. 1, which may not be limited in various embodiments of the present disclosure.

According to various embodiments of the present disclosure, above-mentioned topology may be configured for bidirectional power conversion.

The bridge on the primary side may include a front bridge arm and a rear bridge arm; and the bridge on the second side may also include a front bridge arm and a rear bridge arm. According to various embodiments of the present disclosure, the first power semiconductor device Q1 and the second power semiconductor device Q2 may be configured as the rear bridge arm on the primary side that driving signals may be complementary with each other; the third power semiconductor device Q3 and the fourth power semiconductor device Q4 may be configured as the front bridge arm on the primary side that driving signals may be complementary with each other; the fifth power semiconductor device Q5 and the sixth power semiconductor device Q6 may be configured as the front bridge arm on the secondary side that driving signals may be complementary with each other; and the seventh power semiconductor device Q7 and the eighth power semiconductor device Q8 may be configured as the rear bridge arm on the secondary side arm that driving signals may be complementary with each other. In one embodiment, a driving circuit may be between a processor (i.e., microcontroller MCU in FIG. 6) and the bridge.

In one embodiment, the phase difference between the driving signals of the first power semiconductor device Q1 and the third power semiconductor device Q3 may be $\theta1$, the phase difference of the driving signals between the first power semiconductor device Q1 and the fifth power semiconductor device Q5 may be $\theta2$, and the phase difference of the driving signals between the fifth power semiconductor device Q5 and the seventh power semiconductor device Q7 may be $\theta3$.

According to system power requirement, the power may be controlled by adjusting the magnitude of $\theta2$, and maximum active power may be implemented by adjusting $\theta1$ and $\theta3$ to improve efficiency.

Figure 3:
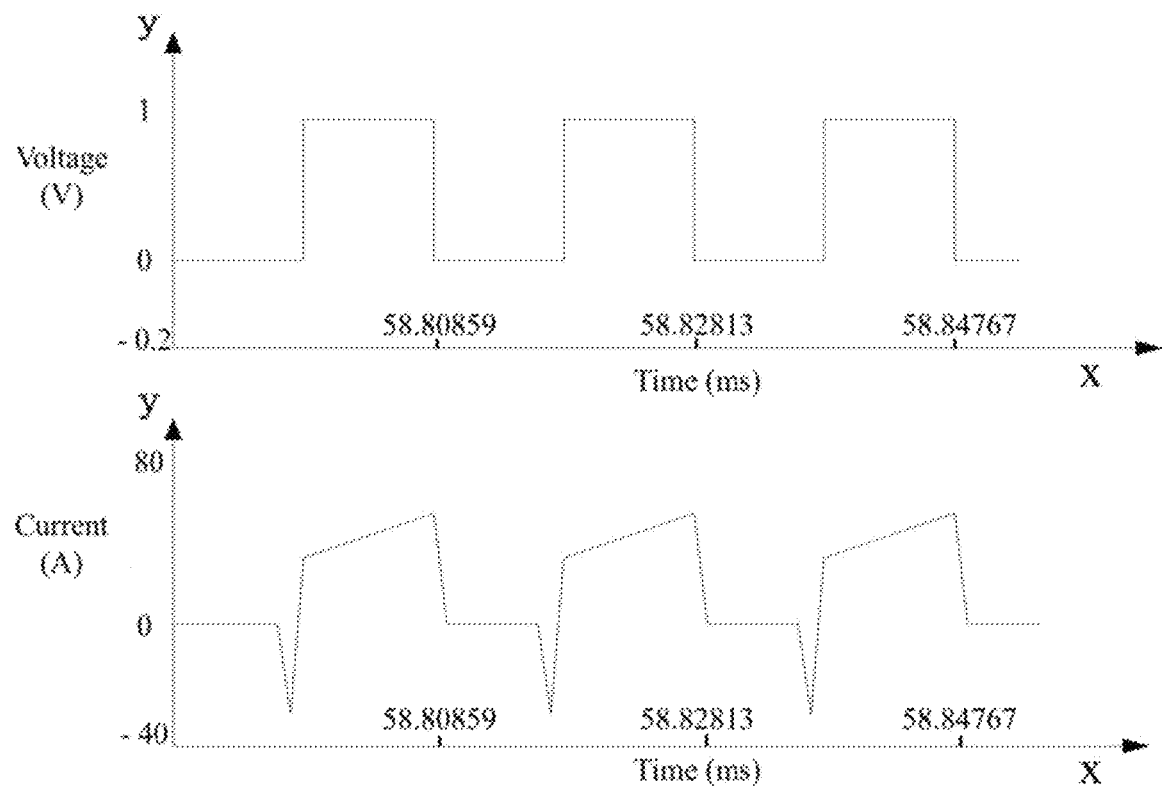
FIG. 3 depicts a turn-off current diagram of an exemplary energy storage circuit with a DAB topology in FIG. 1

Above-mentioned DAB topology may have disadvantages in the energy storage on-grid scenario. When the power semiconductor devices (e.g., transistors), such as the first power semiconductor device to the eighth power semiconductor device (Q1, Q2, Q3, Q4, Q5, Q6, Q7 and Q8), are turned off, the current may be relatively large, which is hard switching with relatively large turn-off loss. FIG. 3 depicts a turn-off current diagram of an exemplary energy storage circuit with a DAB topology in FIG. 1. As shown in FIG. 3, in a 48V/2500 W apparatus, current waveform flowing through the first power semiconductor device Q1 may be a non-sinusoidal waveform, and the shutdown current may reach about 73A. Such large turn-off current may directly result in large turn-off loss and low efficiency. In addition to high loss and high temperature rise, it is difficult to achieve soft switching under low load, which may result in low efficiency and also affect electromagnetic compatibility (EMC) characteristics of the energy storage system. Furthermore, the control of the DAB circuit may be complex with relatively long development and commissioning period. However, due to fast duty-cycle adjustment speed and fast dynamic response, DAB may have advantages in off-grid applications; and the DAB topology may have a relatively wide range of voltage gain.

Figure 4A:
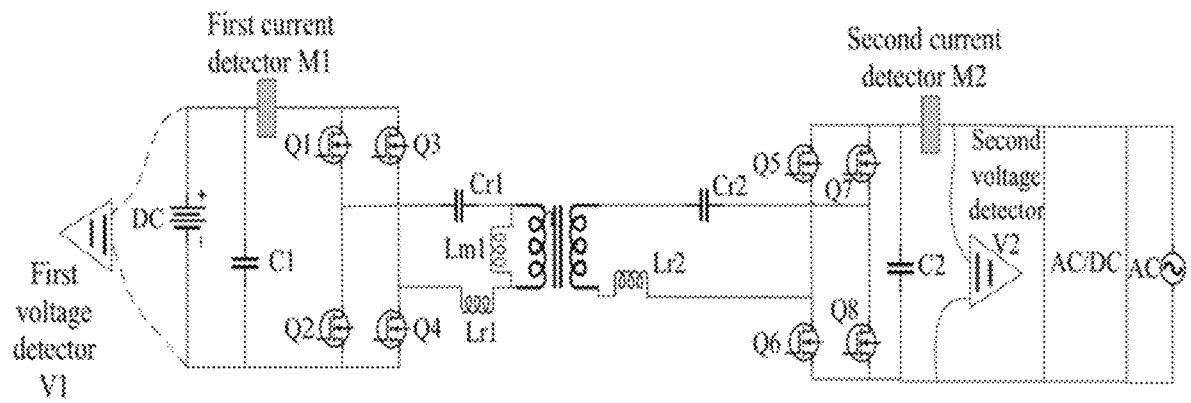
FIG. 4A depicts another exemplary energy storage circuit with a CLLLC topology.
Figure 4B:
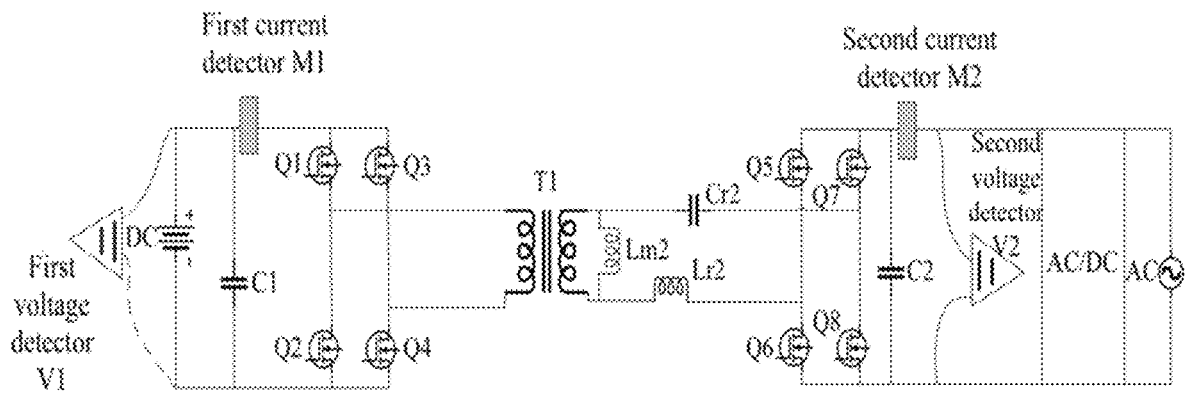
FIG. 4B depicts another exemplary energy storage circuit with a secondary-side LLC topology.
Figure 4C:
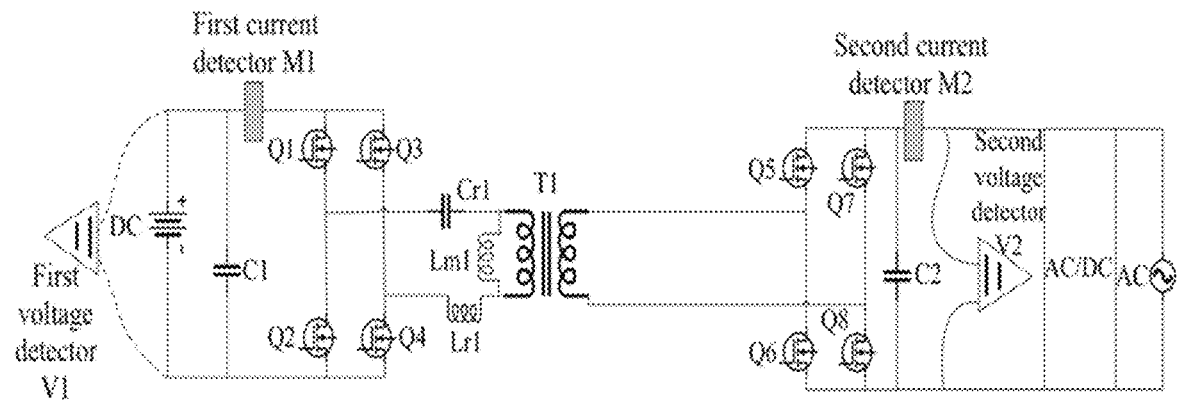
FIG. 4C depicts another exemplary energy storage circuit with a primary-side LLC topology.
Figure 4D:
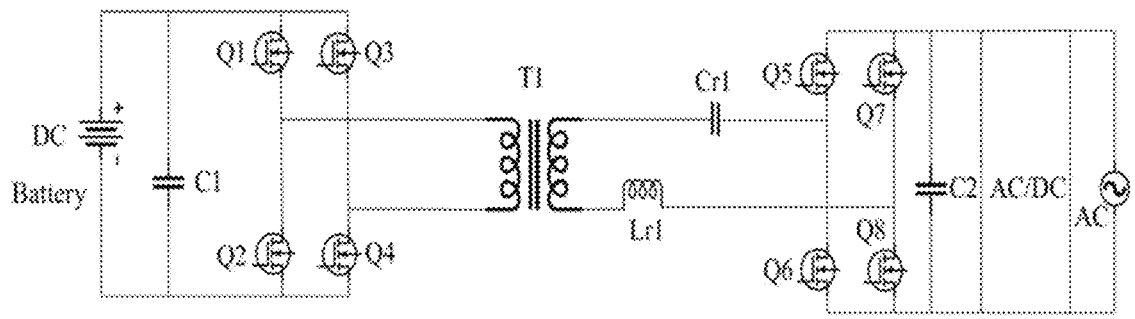
FIG. 4D depicts another exemplary energy storage circuit with a secondary-side LLC topology.

In order to improve the on-grid efficiency of the energy storage system, a resonant topology including an LLC (e.g., 2 inductors and 1 capacitor) topology, a CLLLC (e.g., 3 inductors and 2 capacitors) topology and/or the like with relatively slow response speed and higher efficiency may be configured on the side of the DC/DC isolation charging circuit, as shown in FIGS. 4A-4D. Referring to FIGS. 4A-4C, FIG. 4A depicts another exemplary energy storage circuit with a CLLLC topology; FIG. 4B depicts another exemplary energy storage circuit with a secondary-side LLC topology; FIG. 4C depicts another exemplary energy storage circuit with a primary-side LLC topology; and FIG. 4D depicts another exemplary energy storage circuit with a secondary-side LLC topology. It should be noted that the LLC topology includes 2 inductors and 1 capacitor; and the CLLLC topology includes 3 inductors and 2 capacitors.

The resonant topology may be configured for on-grid apparatuses. The resonant topology may be an isolated topology which may be divided into the primary side and the secondary side. Topologies may include the CLLLC topology as shown in FIG. 4A, the secondary-side LLC topology as shown in FIG. 4B, and the primary-side LLC topology as shown in FIG. 4C.

Referring to FIG. 4A, the primary side may include a plurality of power semiconductor devices (MOSFETs) including the first power semiconductor device Q1, the second power semiconductor device Q2, the third power semiconductor device Q3 and the fourth power semiconductor device Q4; and include the first capacitor C1 (e.g., the voltage stabilizing capacitor), the first current detector M1, the first voltage detector V1, the first resonant capacitor Cr1, and the resonant inductor Lr1. The secondary side may include a plurality of power semiconductor devices (MOSFETs) including the fifth power semiconductor device Q5, the sixth power semiconductor device Q6, the seventh power semiconductor device Q7 and the eighth power semiconductor device Q8; and include a power inductor Lr2, the second resonant capacitor Cr2, the second current detector M2, the second voltage detector V2, and the second capacitor C2. The primary and secondary sides may be connected by the transformer T1, and the transformer T1 may have an excitation inductor. In other embodiments, an excitation inductor (e.g., the excitation inductor Lm1 in FIG. 4A) may be optionally included and configured in parallel with the transformer T1.

Exemplarily, the drain electrode of the first power semiconductor device Q1 may be electrically connected to the positive electrode (potential) of the first capacitor C1 through the first current detector M1, the source electrode of the first power semiconductor device Q1 may be electrically connected to the drain electrode of the second power semiconductor device Q2 in series, and the source electrode of the second power semiconductor device Q2 may be connected to the negative electrode of the first capacitor C1. Exemplarily, the drain electrode of the third power semiconductor device Q3 may be electrically connected to the positive electrode of the first capacitor C1 through the first current detector M1, the source electrode of the third power semiconductor device Q3 may be electrically connected to the drain electrode of the fourth power semiconductor device Q4 in series, and the source electrode of the fourth power semiconductor device Q4 may be electrically connected to the negative electrode of the first capacitor C1. It should be noted that the positions of the current detectors and voltage detectors in the present disclosure may be adjusted according to actual needs, which may not be limited in various embodiments of the present disclosure.

In one embodiment, the first resonant capacitor Cr1 and the resonant inductor Lr1 may be electrically connected in series to a primary-side resonant cavity and connected to two ports on the primary side of the transformer.

Exemplarily, two taps on the primary side of the transformer may be electrically connected to the series connection point of the first power semiconductor device Q1 and the second power semiconductor device Q2, and to the series connection point of the third power semiconductor device Q3 and the fourth power semiconductor device Q4, respectively.

Exemplarily, the drain electrode of the fifth power semiconductor device Q5 may be electrically connected to the positive electrode of the second capacitor C2, the source electrode of the fifth power semiconductor device Q5 may be electrically connected to the drain electrode of Q6 in series, and the source electrode of the sixth power semiconductor device Q6 may be electrically connected to the negative electrode of the second capacitor C2. Exemplarily, the drain electrode of the seventh power semiconductor device Q7 may be electrically connected to the positive terminal of the second capacitor C2, the source electrode of the seventh power semiconductor device Q7 may be electrically connected to the drain electrode of the eighth power semiconductor device Q8 in series, and the source electrode of the eighth power semiconductor device Q8 may be electrically connected to the negative electrode of the second capacitor C2.

In one embodiment, the second resonant capacitor Cr2 and the power inductor Lr2 may be electrically connected in series to a secondary-side resonant cavity and connected to two ports on the secondary side of the transformer.

Exemplarily, two taps may be on the secondary side of the transformer. One tap may be electrically connected to the series connection point of the fifth power semiconductor device Q5 and the sixth power semiconductor device Q6; and another tap may be electrically connected to the series connection point of the seventh power semiconductor device Q7 and the eighth power semiconductor device Q8.

According to actual situation, the components on the primary and secondary sides may be adjusted to form other similar topologies such as the secondary-side LLC shown in FIG. 4B and the primary-side LLC shown in FIG. 4C, and the secondary-side LLC shown in FIG. 4D. It can be understood that same or similar components and structures of the secondary-side LLC and the primary-side LLC may refer to above-mentioned topologies, which may not be described in detail herein.

According to various embodiments of the present disclosure, the first power semiconductor device Q1 and the second power semiconductor device Q2 may be configured as the rear bridge arm on the primary side that driving signals may be complementary with each other; the third power semiconductor device Q3 and the fourth power semiconductor device Q4 may be configured as the front bridge arm on the primary side that driving signals may be complementary with each other; the fifth power semiconductor device Q5 and the sixth power semiconductor device Q6 may be configured as the front bridge arm on the secondary side that driving signals may be complementary with each other; and the seventh power semiconductor device Q7 and the eighth power semiconductor device Q8 may be configured as the rear bridge arm on the secondary side arm that driving signals may be complementary with each other.

By sampling current and voltage, the frequency and duty cycle of the power semiconductor devices may be derived from gain curves. The control of output voltage and current may be achieved by controlling the duty cycle and frequency of the power semiconductor devices.

Figure 5:
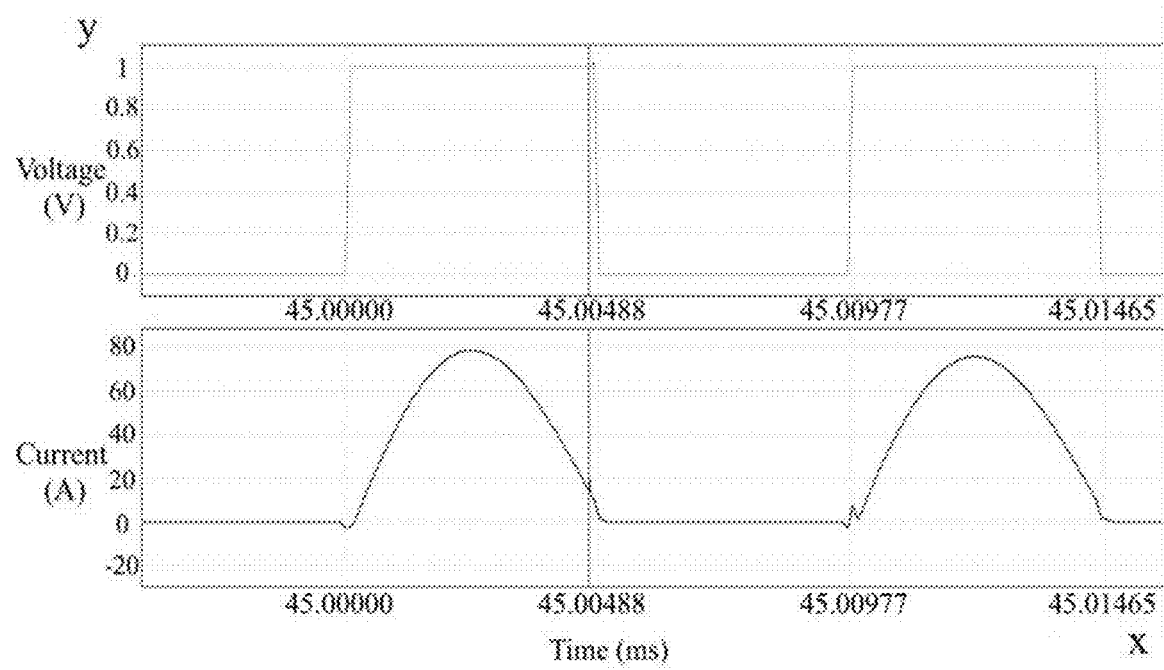
FIG. 5 depicts a turn-off current diagram of an exemplary energy storage circuit with a primary-side LLC topology in FIG. 4C.

Above-mentioned resonant topologies may have disadvantages in the energy storage off-grid scenario. The LLC, CLLC and other resonant topological loops may respond slowly; and under the application of sudden load change, it may be easy to cause the risk of equipment downtime. In addition, the voltage gain range may be relatively narrow, and the DC/DC boost may not be realized when the battery voltage is extremely low or high. However, above-mentioned resonant topologies may have advantages in on-grid applications due to high efficiency. FIG. 5 depicts a turn-off current diagram of an exemplary energy storage circuit with a primary-side LLC topology in FIG. 4C. Referring to FIG. 5, for example, when power semiconductor devices, such as the first power semiconductor device to the eighth power semiconductor device (Q1, Q2, Q3, Q4, Q5, Q6, Q7 and Q8), are turned off, the current may be relatively small (e.g., about 14.3 A). Although such turn-off is also hard switching, the turn-off loss may be small with high efficiency.

Figure 6:
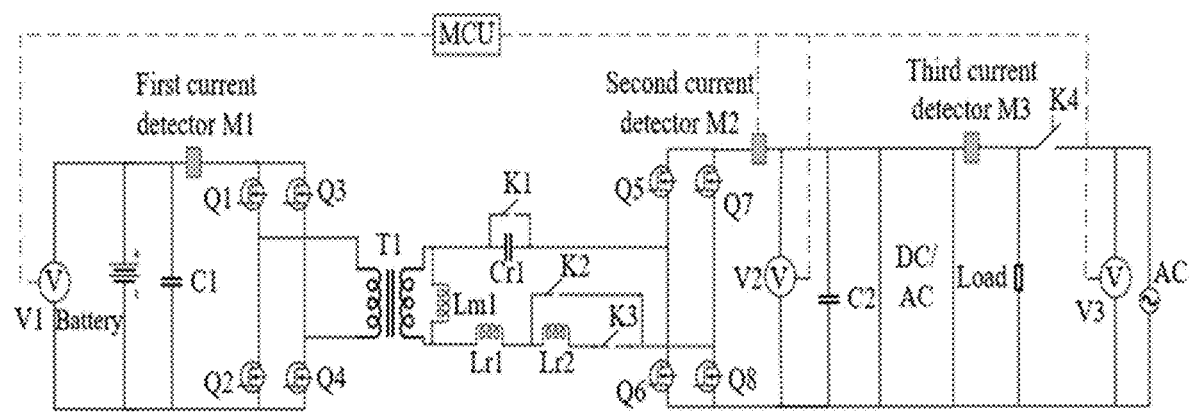
FIG. 6 depicts an exemplary energy storage circuit according to various disclosed embodiments of the present disclosure.
Figure 7:
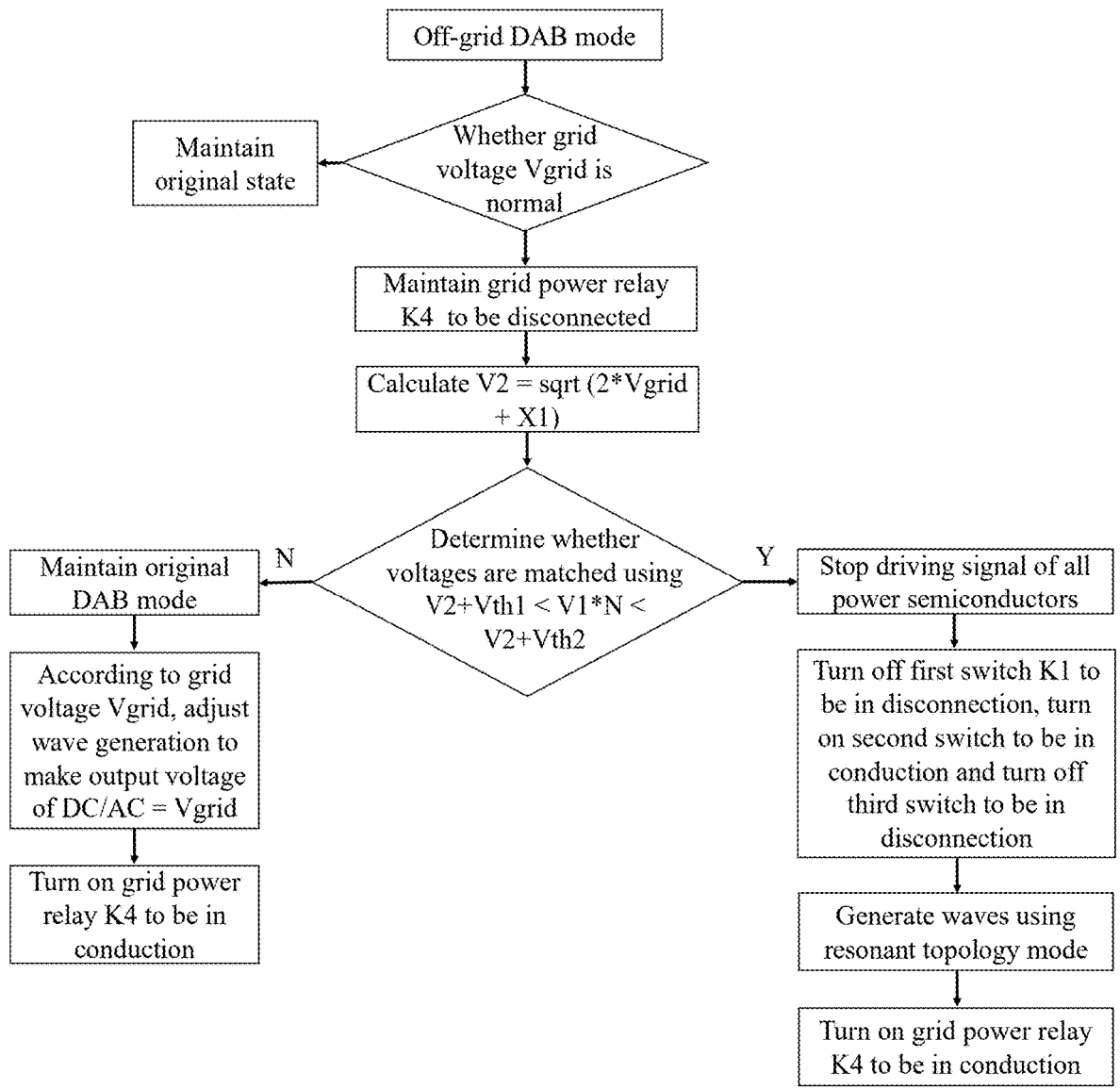
FIG. 7 depicts an exemplary flowchart of controlling an energy storage circuit according to various disclosed embodiments of the present disclosure.

According to various embodiments of the present disclosure, an energy storage circuit is provided. Referring to FIGS. 6-7, FIG. 6 depicts an exemplary energy storage circuit according to various disclosed embodiments of the present disclosure; and FIG. 7 depicts an exemplary flowchart of controlling an energy storage circuit according to various disclosed embodiments of the present disclosure.

In various embodiments of the present disclosure, the energy storage circuit includes a DC/DC circuit, including a primary side and a secondary side which are connected through a transformer, where the primary side of the DC/DC circuit includes a first voltage detector configured to measure a primary-side voltage; and the secondary side of the DC/DC circuit includes a first resonant capacitor, a power inductor, a first switch crossing the first resonant capacitor, a second switch crossing the power inductor and a third switch connected in series with the power inductor, and a second voltage detector configured to measure a secondary-side voltage; at least one AC/DC circuit electrically connected between the DC/DC circuit and an electrical grid; a third grid voltage detector configured to measure a grid voltage and detect an on-grid state or an off-grid state; a grid power relay; and a processor. In response to the on-grid state being detected and the grid voltage being detected abnormal, the processor is configured to turn off the grid power relay for disconnection and generate waves using a dual active bridge (DAB) topology mode; and in response to the off-grid state being detected and the grid voltage being detected normal, the processor is configured to determine whether the primary-side voltage is matched with the secondary-side voltage.

In one embodiment, the energy storage circuit further includes a plurality of power semiconductor devices in the DC/DC circuit. The plurality of power semiconductor devices includes a first power semiconductor device, a second power semiconductor device, a third power semiconductor device and a fourth power semiconductor device at the primary side of the DC/DC circuit; and a fifth power semiconductor device, a sixth power semiconductor device, a seventh power semiconductor device and an eighth power semiconductor device at the secondary side of the DC/DC circuit. A first terminal of the first switch is electrically connected to each of a first terminal of the first resonant capacitor, a first terminal of an excitation inductor, and one tap of the transformer; and a second terminal of the first switch is electrically connected to each of a second terminal of the first resonant capacitor, a source electrode of the fifth power semiconductor device and a drain electrode of the sixth power semiconductor device; and a first terminal of the second switch is electrically connected to a first terminal of the power inductor, and a second terminal of the second switch is electrically connected to each of a second terminal of the third switch, a source electrode of the seventh power semiconductor device and a drain electrode of the eighth power semiconductor device; and a first terminal of the third switch is electrically connected to a second terminal of the power inductor.

In one embodiment, the energy storage circuit further includes a resonant inductor connected in series with the power inductor, where the first terminal of the second switch is further connected to a second terminal of the resonant inductor; and an excitation inductor configured in parallel with the transformer, where a first terminal of the excitation inductor is connected to each of the first terminal of the first switch and the one tap of the transformer; and a second terminal of the excitation inductor is connected to each of a first terminal of the resonant inductor and another tap of the transformer.

In one embodiment, in response to the primary-side voltage is determined to be matched with the secondary-side voltage, the processor is configured to generate waves using a resonant topology mode; and in response to the primary-side voltage is determined to be not matched with the secondary-side voltage, the processor is configured to generate the waves using the DAB topology mode.

In one embodiment, in response to the primary-side voltage is determined to be matched with the secondary-side voltage, before generating the waves using the resonant topology mode, the processor is further configured to stop sending a wave-generating driving signal to the plurality of power semiconductor devices, turn off the first switch for disconnection, turn on the second switch for conduction, and turn off the third switch for disconnection.

In one embodiment, in response to the on-grid state being detected and the grid voltage being detected abnormal, before generating the waves using the DAB topology mode, the processor is further configured to stop sending a wave-generating driving signal to the plurality of power semiconductor devices, turn on the first switch for conduction, turn off the second switch for disconnection, and turn on the third switch for conduction.

In one embodiment, in response to the on-grid state being detected and the grid voltage being detected normal, when $V2+Vth1<V1*N<V2+Vth2$, where V1 denotes the primary-side voltage, V2 denotes the secondary-side voltage, Vth1 denotes a first voltage deviation, Vth2 denotes a second voltage deviation and N denotes a transformation ratio of the transformer, the processor is configured to turn off the first switch and the third switch for disconnection, turn on the second switch for conduction, and generate waves using a resonant topology mode; and when $V1*N<V2+Vth1$ or $V1*N>V2+Vth2$, the processor is configured to stop sending a wave-generating driving signal to the plurality of power semiconductor devices, turn on the first switch for conduction, turn off the third switch for disconnection, turn on the third switch for conduction, and generate the waves using the DAB topology mode.

In one embodiment, the third switch is adjusted according to a resistance value of the power inductor, where in response to the resistance value of the power inductor is greater than a resistance value of the second switch, the third switch is included in the energy storage circuit; and in response to the resistance value of the power inductor is equal to or less than the resistance value of the second switch, the third switch is not included in the energy storage circuit, and two terminals of the power inductor are connected in parallel with two terminals of the second switch respectively.

In one embodiment, the first switch or the second switch is a mechanical apparatus, the mechanical apparatus including a relay or a power semiconductor device including a metal-oxide-semiconductor field-effect transistor (MOSFET).

In one embodiment, the energy storage circuit further includes a first current detector between a positive electrode of a first capacitor and a drain electrode of the first power semiconductor device, configured to detect a primary-side current; a second current detector between a positive electrode of a second capacitor and a drain electrode of the seventh power semiconductor device, configured to detect a secondary-side current; and a third current detector, configured to detect a grid current, where each of the first current detector, the second current detector and the third current detector is a Hall effect sensor, a shunt or a current transformer.

The primary-side current refers to the battery current, which is provided by or delivered to the battery. The battery current may flow in and out of the battery to realize energy storage. The secondary-side current refers the current flowing into and out of BUS after DC/DC conversion. The grid current refers the current flowing into or out of the grid from the energy storage apparatus.

In the DC/DC conversion of the present disclosure, bypass switches including the first switch K1 and the second switch K2 may be respectively connected in parallel with the first resonant capacitor Cr1 and the power inductor Lr2; and the operating modes may be switched by determining the voltage and current.

Referring to FIG. 6, the first current detector M1 may be a current sampling apparatus, which may be a shunt, a Hall sensor and/or the like, and configured for sampling the current on the primary side. The first current detector M1 may be between the positive electrode of the first capacitor C1 and the drain electrode of the first power semiconductor device Q1. The second current detector M2 may be another current sampling apparatus, which may be a shunt, a Hall sensor and/or the like, and configured for sampling the current on the secondary side. The second current detector M2 may be between the positive electrode of the second capacitor C2 and the drain electrode of the seventh power semiconductor device Q7.

Exemplarily, the first power semiconductor device Q1, the second power semiconductor device Q2, the third power semiconductor device Q3, and the fourth power semiconductor device Q4 may form a bridge structure including the front bridge arm and the rear bridge arm. The source electrode of the first power semiconductor device Q1 may be connected in series with the drain electrode of the second power semiconductor device Q2; the source electrode of the third power semiconductor device Q3 may be electrically connected in series with the drain electrode of the fourth power semiconductor device Q4; the drain electrode of the first power semiconductor device Q1 may be electrically connected with the drain electrode of the third power semiconductor device Q3; and the source electrode of the second power semiconductor device Q2 may be electrically connected with the source electrode of the fourth power semiconductor device Q4. The first power semiconductor device Q1, the second power semiconductor device Q2, the third power semiconductor device Q3 and the fourth power semiconductor device Q4 may be configured for mode switching.

Exemplarily, the fifth power semiconductor device Q5, the sixth power semiconductor device Q6, the seventh power semiconductor device Q7, and the eighth power semiconductor device Q8 may form a bridge structure including the front bridge arm and the rear bridge arm. The source electrode of the seventh power semiconductor device Q7 may be electrically connected in series with the drain electrode of the eighth power semiconductor device Q8; the source electrode of the fifth power semiconductor device Q5 may be electrically connected in series with the drain electrode of the sixth power semiconductor device Q6; the drain electrode of the fifth power semiconductor device Q5 may be electrically connected with the drain electrode of the seventh power semiconductor device Q7; and the source electrode of the sixth power semiconductor device Q6 may be electrically connected to the eighth power semiconductor device Q8. The fifth power semiconductor device Q5, the sixth power semiconductor device Q6, the seventh power semiconductor device Q7, the eighth power semiconductor device Q8 may be configured for mode switching.

The windings of the transformer T1 on the primary side may be respectively connected to the midpoint of the front bridge arm and the midpoint of the rear bridge arm. The first voltage detector V1 may be configured to detect the primary-side voltage; and the second voltage detector V2 may be configured to detect the secondary-side voltage (e.g., bus voltage).

Referring to FIG. 6, optionally, the secondary side may include the excitation inductor Lm1, the first resonant capacitor Cr1, the resonant inductor Lr1, the power inductor Lr2, the first switch K1, the second switch K2, the third switch K3, the second capacitor C2, the second current detector M2, and the second voltage detector V2.

Exemplarily, the excitation inductor Lm1 and the resonant inductor Lr1 may be integrated by the excitation inductor and leakage inductor of the transformer; and may also be a separate apparatus, which may not be limited in the present disclosure.

In various embodiments of the present disclosure, resonant capacitors, resonant inductors, and power inductors may connected in series to the transformer and bridge topology, and relative positions of these components may be freely disposed. The first switch K1 may be electrically connected in parallel with the first resonant capacitor Cr1. One terminal of the second switch K2 may be electrically connected to one terminal of the power inductor Lr2, and another terminal of the second switch K2 may be electrically connected to one terminal of the third switch K3. The third switch K3 may be electrically connected in series with the power inductor Lr2. One terminal of the third switch K3 may be electrically connected with the power inductor Lr2, and another terminal of the third switch K3 may be electrically connected with one terminal of the second switch K2. The first switch K1, the second switch K2, and the third switch K3 may be various types of switches such as relays and power semiconductor devices, which may not be limited in various embodiments of the present disclosure. In FIG. 6, voltage detection function is needed on the grid side of the energy storage apparatus which may be configured to detect the grid status and transmit the grid voltage and the grid state to the processor (i.e., microcontroller MCU in FIG. 6 or main controller).

According to various embodiments of the present disclosure, the operating processes of topology switching may be divided into two main scenarios.

For the scenario one, at the on-grid state, the grid voltage and the battery voltage (i.e., the primary-side voltage) may vary greatly, resulting in a mismatch between the primary-side voltage and the secondary-side voltage, and the energy storage apparatus may not operate normally. In various embodiments of the present disclosure, the scenario one is described in detail hereinafter.

At the on-grid state, the primary-side voltage (e.g., the battery voltage) and the secondary-side voltage (e.g., the BUS voltage) may be detected through the first voltage detector V1 and the second voltage detector V2. When V2+Vth1<V1*N<V2+Vth2, the first switch K1 and the third switch K3 may be turned off for disconnection, and the second switch K2 may be turned on for conduction. The processor (e.g., MCU in FIG. 6) may perform wave generation operation on the power semiconductor devices (the first power semiconductor device to the eighth power semiconductor device Q1~Q8) in a manner of resonant topology.

When V1*N<V2+Vth1 or V1*N>V2+Vth2 is detected, the processor may turn off the driving of the power semiconductor devices (the first power semiconductor device to the eighth power semiconductor device Q1~Q8), the first switch K1 may be immediately turned on for conduction and the third switch K3 may be immediately turned off for disconnection after turning off the driving of the power semiconductor devices. After the second switch K2 is turned off for disconnection, the third switch K3 may be turned on for conduction.

At this point, the processor may generate waves in the DAB topology to control the power semiconductor devices (the first power semiconductor device to the eighth power semiconductor device Q1~Q8).

The third switch (switching device) K3 may be adjusted according to the parameter (i.e., resistance value) of the power inductor Lr2. When the resistance value Rlr2 of the power inductor Lr2 is greater than the resistance value Rk2 of K2, that is, Rlr2>Rk2, the third switch K3 may be included in the energy storage circuit. When Rlr2≤Rk2, the third switch K3 may be turned on for conduction or may be not included in the energy storage circuit. In one embodiment, optionally, two terminals of the power inductor Lr2 may be connected in parallel with two terminals of the second switch K2. Vth1 and Vth2 may be configured to be hysteresis voltages to avoid repeated switching oscillations at voltage comparison points.

For the scenario two, the energy storage apparatus may be switched between the on-grid state and the off-grid state. In various embodiments of the present disclosure, the scenario two is described in detail hereinafter.

In response to the energy storage apparatus is in the DAB (operating) mode before the grid power failure, there is no need to switch modes after the grid power failure. In response to the energy storage apparatus is in the operating mode of the resonant topology before the grid power failure, it needs to switch the mode from the resonant topology to the DAB topology. Whether the grid power is operating normally may be determined by the third voltage detector V3 (e.g., grid detection unit). By detecting the grid voltage of an output relay (i.e., grid power relay), whether the grid power is normal may be determined. A voltage detection point may be adjacent to a grid power relay K4.

For example, when it is detected that the grid voltage Vgrid is in an abnormal state, the processor may transmit a command to disconnect the grid power relay K4; driving all main power semiconductor devices including the power semiconductor devices (the first power semiconductor device to the eighth power semiconductor device Q1~Q8) and the DC/AC circuit to generate waves may be stopped; and after driving all main power semiconductor devices to generate waves is stopped, the first switch K1 may be immediately turned on for conduction, and the second switch K2 may be immediately turned off for disconnection. After the second switch K2 is turned off for disconnection, the third switch K3 may be turned on for conduction. Subsequently, the processor may generate waves in the control DAB manner.

When the energy storage apparatus is in the off-grid state, after the third voltage detector detects that the grid voltage Vgrid is in a normal state, the calculation formula $V2=\sqrt{(2*Vgrid+X1)}$ and V2+Vth1<V1*N<V2+Vth2 may be configured to determine whether the secondary-side voltage is matched with the primary-side voltage, where X1 denotes a voltage margin. Exemplarily, the voltage margin may be between around 5V and around 30V.

In response to the secondary-side voltage is not matched with the primary-side voltage, there is no need to switch the control mode, and the control DAB topology mode may be maintained.

In response to the secondary-side voltage is matched with the primary-side voltage, the process may transmit a command to stop driving all main power semiconductor devices (including the first power semiconductor device to the eighth power semiconductor device Q1~Q8) and the DC/AC circuit to generate waves; and after driving all main power semiconductor devices is stopped, the first switch K1 may be immediately turned off for disconnection, and the second switch K2 may be immediately turned on for conduction. After the second switch K2 is turned on for conduction, the third switch K3 may be turned off for disconnection. Subsequently, the energy storage apparatus may enter the resonant topology mode.

The present disclosure may reduce the problems of high cost and low power density of existing energy storage products. The present disclosure may adopt the strategy of two-level topology switching, such that the efficiency of the energy storage apparatus and the power density may be improved, thereby reducing the cost. Two-level topology may be more efficient than three-level topology. For the efficiency of existing three-level topology, $n3=n\_pre*n\_bus*n\_dcac$, where n3 denotes efficiency of the three-level topology, n_pre denotes efficiency of the first level in the three-level topology, n_bus denotes efficiency of the second level in the three-level topology and n_dcac denotes efficiency of the third level in the three-level topology. For the efficiency of the two-level topology that the first level is DAB, $n1=n\_dab*n\_dcac$, where n1 denotes efficiency of the two-level topology, n_dab denotes efficiency of the first level in the two-level topology, and n_dcac denotes efficiency of the second level in the two-level topology. For the efficiency of the two-level topology that the first level is resonant topology, $n2=n\_pre*n\_dcac$. Regardless of whether the first level is the resonant topology or DAB topology, the efficiency of two-level topology may be always higher than the efficiency for three-level topology. In such two two-level topologies (architectures), the efficiency of the two-level topology that the first level is resonant topology may be higher than the efficiency of the two-level topology that the first level is DAB topology, that is, $n1>n2>n3$. The present disclosure may adopt the two-level topology, which may have an advantage in efficiency compared with existing three-level topology. Meanwhile, due to that one level conversion is removed, power components may be reduced by ⅓, and power density may be increased by ⅓. Furthermore, through the switching control manner of the two-level topology, the resonant topology may be adopted in the on-grid mode, such that energy storage apparatus efficiency may be optimized under electrical isolation requirement. In addition, due to the reduction of power components, the cost may be also greatly reduced.

The present disclosure may also reduce the problem that the dynamic characteristics of the off-grid scenario and inefficiency of the on-grid scenario cannot coexist. For the off-grid application scenario of user's energy storage apparatus, dynamic loading feature may mostly affect user experience. Compared with the LLC topology, the DAB topology may have a higher dynamic response speed. When the user suddenly increases or shut down high-power electrical apparatus, the DAB topology may respond extremely fast by quickly adjusting to make the apparatus run smoothly.

The present disclosure may also have high adaptability to scenarios with high grid fluctuations. The grid voltage may fluctuate significantly in some areas, for example, ±20% fluctuations may be reached; and the primary-side voltage (e.g., the battery voltage) may also change significantly due to different power levels. Therefore, it is difficult to match previous and subsequent voltages through the resonant topology. Once the match is unsuccessful, the energy storage apparatus may have the risk of downtime and may be even serious damaged. However, for the present disclosure, in the case of the mismatch between the primary-side voltage (e.g., the battery voltage) and the grid voltage, such problem may be reduced through topology switching to ensure safe apparatus operation.

Figure 8A:
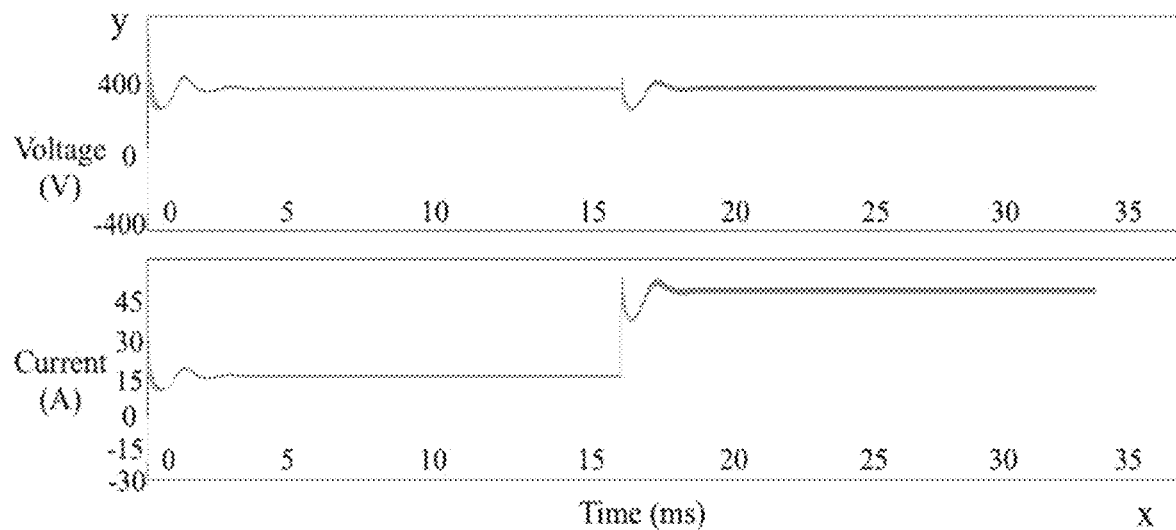
FIG. 8A depicts a voltage change diagram of an exemplary energy storage circuit with a resonant topology according to various disclosed embodiments of the present disclosure.
Figure 8B:
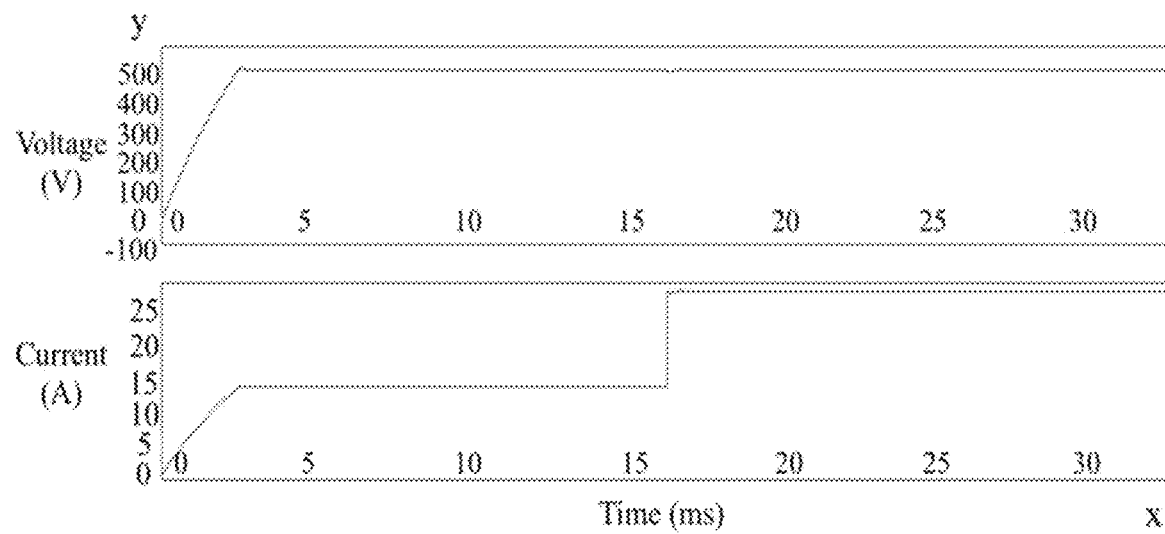
FIG. 8B depicts a voltage change diagram of an exemplary energy storage circuit with a DAB topology according to various disclosed embodiments of the present disclosure.

In the case of same voltage output, same load may be suddenly added. FIG. 8A depicts a voltage change diagram of an exemplary energy storage circuit with a resonant topology according to various disclosed embodiments of the present disclosure; and FIG. 8B depicts a voltage change diagram of an exemplary energy storage circuit with a DAB topology according to various disclosed embodiments of the present disclosure. FIG. 8A shows that, for the resonant topology, the duration of about 4.003 ms may be between the time point of change to the time point of being recovered for the output voltage of 400V; and FIG. 8B shows that, for the DAB topology, the duration of about 0.3484 ms may be between the time point of change to the time point of being recovered for the output voltage of 400V. Referring to FIGS. 8A-8B, it can be seen that the DAB topology may be significantly faster than the resonant topology.

Various embodiments of the present disclosure further provide an energy storage circuit. The energy storage circuit includes a DC/DC circuit, including a primary side and a secondary side which are connected through a transformer, where the primary side of the DC/DC circuit includes a first voltage detector configured to measure a primary-side voltage; and the secondary side of the DC/DC circuit includes a first resonant capacitor, a power inductor, a first switch crossing the first resonant capacitor, a second switch crossing the power inductor, and a second voltage detector configured to measure a secondary-side voltage; at least one AC/DC circuit electrically connected to the DC/DC circuit; a grid power relay; and a processor. In response to an on-grid state being detected, the processor is configured to turn on the first switch for conduction and turn off the second switch for disconnection and generate waves using a dual active bridge (DAB) topology mode; and in response to an off-grid state being detected, the processor is configured to turn off the first switch for disconnection and turn on the second switch for conduction and generate waves using a resonant topology mode. It should be understood that the third switch is not included in the energy storage circuit herein, and other units or components may refer to detail description of above-mentioned energy storage circuit in FIG. 6, which may not be described in detail herein.

Various embodiments of the present disclosure further provide a control method of an energy storage circuit. The energy storage circuit includes a DC/DC circuit, including a primary side and a secondary side which are connected through a transformer, where the primary side of the DC/DC circuit includes a first voltage detector configured to measure a primary-side voltage; and the secondary side of the DC/DC circuit includes a first resonant capacitor, a power inductor, a first switch crossing the first resonant capacitor, a second switch crossing the power inductor and a third switch connected in series with the power inductor, and a second voltage detector configured to measure a secondary-side voltage; at least one AC/DC circuit electrically connected between the DC/DC circuit and an electrical grid; a third grid voltage detector configured to measure a grid voltage and detect an on-grid state or an off-grid state; a grid power relay; and a processor. The method includes in response to the on-grid state being detected and the grid voltage being detected abnormal, turning off the grid power relay for disconnection and generating waves using a dual active bridge (DAB) topology mode; and in response to the off-grid state being detected and the grid voltage being detected normal, determining whether the primary-side voltage is matched with the secondary-side voltage.

From above-mentioned embodiments, it may be seen that at least following beneficial effects may be achieved in the present disclosure.

The present disclosure may reduce the problems of high cost and low power density of existing energy storage products. The present disclosure may adopt the two-level topology. Compared with the three-level topology, the two-level topology may use less power semiconductor devices, and the power density may be higher. Furthermore, the present disclosure may reduce the problem that the dynamic characteristics of the off-grid scenario and inefficiency of the on-grid scenario cannot coexist. Switching components may be configured to switch the topologies for different scenarios. Using the LLC and other resonant topologies under the on-grid scenario (condition) may improve overall system efficiency and bring benefits to the user. In addition, using the DAB topology in the off-grid scenario may achieve fast response and meet dynamic characteristics. Moreover, the energy storage circuit in the present disclosure may have the advantages of high efficiency, high reliability, low cost, simple control, short development cycle, and the like.

Although some embodiments of the present disclosure have been described in detail through various embodiments, those skilled in the art should understand that above embodiments may be for illustration only and may not be intended to limit the scope of the present disclosure. Those skilled in the art should understand that modifications may be made to above embodiments without departing from the scope and spirit of the present disclosure. The scope of the present disclosure may be defined by the appended claims.

What is claimed is:

1. An energy storage circuit, comprising:
   a DC/DC circuit, including a primary side and a secondary side which are connected through a transformer, wherein the primary side of the DC/DC circuit includes a first voltage detector configured to measure a primary-side voltage; and the secondary side of the DC/DC circuit includes a first resonant capacitor, a power inductor, a first switch crossing the first resonant capacitor, a second switch crossing the power inductor and a third switch connected in series with the power inductor, and a second voltage detector configured to measure a secondary-side voltage;
   at least one AC/DC circuit electrically connected between the DC/DC circuit and an electrical grid; and
   a third grid voltage detector configured to measure a grid voltage and detect an on-grid state or an off-grid state; a grid power relay; and a processor, wherein:
      in response to the on-grid state being detected and the grid voltage being detected abnormal, the processor is configured to turn off the grid power relay for disconnection and generate waves using a dual active bridge (DAB) topology mode; and
      in response to the off-grid state being detected and the grid voltage being detected normal, the processor is configured to determine whether the primary-side voltage is matched with the secondary-side voltage.

2. The energy storage circuit according to claim 1, further including:
   a plurality of power semiconductor devices in the DC/DC circuit, wherein the plurality of power semiconductor devices includes:
      a first power semiconductor device, a second power semiconductor device, a third power semiconductor device and a fourth power semiconductor device at the primary side of the DC/DC circuit; and
      a fifth power semiconductor device, a sixth power semiconductor device, a seventh power semiconductor device and an eighth power semiconductor device at the secondary side of the DC/DC circuit, wherein:
         a first terminal of the first switch is electrically connected to each of a first terminal of the first resonant capacitor, a first terminal of an excitation inductor, and one tap of the transformer; and a second terminal of the first switch is electrically connected to each of a second terminal of the first resonant capacitor, a source electrode of the fifth power semiconductor device and a drain electrode of the sixth power semiconductor device; and
         a first terminal of the second switch is electrically connected to a first terminal of the power inductor, and a second terminal of the second switch is electrically connected to each of a second terminal of the third switch, a source electrode of the seventh power semiconductor device and a drain electrode of the eighth power semiconductor device; and a first terminal of the third switch is electrically connected to a second terminal of the power inductor.

3. The energy storage circuit according to claim 2, further including:
   a resonant inductor connected in series with the power inductor, wherein the first terminal of the second switch is further connected to a second terminal of the resonant inductor; and
   an excitation inductor configured in parallel with the transformer, wherein a first terminal of the excitation inductor is connected to each of the first terminal of the first switch and the one tap of the transformer; and a second terminal of the excitation inductor is connected to each of a first terminal of the resonant inductor and another tap of the transformer.

4. The energy storage circuit according to claim 2, wherein:
   in response to the primary-side voltage is determined to be matched with the secondary-side voltage, the processor is configured to generate waves using a resonant topology mode; and
   in response to the primary-side voltage is determined to be not matched with the secondary-side voltage, the processor is configured to generate the waves using the DAB topology mode.

5. The energy storage circuit according to claim 4, wherein:
   in response to the primary-side voltage is determined to be matched with the secondary-side voltage, before generating the waves using the resonant topology mode, the processor is further configured to stop sending a wave-generating driving signal to the plurality of power semiconductor devices, turn off the first switch for disconnection, turn on the second switch for conduction, and turn off the third switch for disconnection.

6. The energy storage circuit according to claim 2, wherein:
in response to the on-grid state being detected and the grid voltage being detected abnormal, before generating the waves using the DAB topology mode, the processor is further configured to stop sending a wave-generating driving signal to the plurality of power semiconductor devices, turn on the first switch for conduction, turn off the second switch for disconnection, and turn on the third switch for conduction.

7. The energy storage circuit according to claim 2, wherein:
in response to the on-grid state being detected and the grid voltage being detected normal:
when V2+Vth1<V1*N<V2+Vth2, wherein V1 denotes the primary-side voltage, V2 denotes the secondary-side voltage, Vth1 denotes a first voltage deviation, Vth2 denotes a second voltage deviation and N denotes a transformation ratio of the transformer, the processor is configured to turn off the first switch and the third switch for disconnection, turn on the second switch for conduction, and generate waves using a resonant topology mode; and
when V1*N<V2+Vth1 or V1*N>V2+Vth2, the processor is configured to stop sending a wave-generating driving signal to the plurality of power semiconductor devices, turn on the first switch for conduction, turn off the third switch for disconnection, turn on the third switch for conduction, and generate the waves using the DAB topology mode.

8. The energy storage circuit according to claim 2, wherein:
the third switch is adjusted according to a resistance value of the power inductor, wherein:
in response to the resistance value of the power inductor is greater than a resistance value of the second switch, the third switch is included in the energy storage circuit; and
in response to the resistance value of the power inductor is equal to or less than the resistance value of the second switch, the third switch is not included in the energy storage circuit, and two terminals of the power inductor are connected in parallel with two terminals of the second switch respectively.

9. The energy storage circuit according to claim 2, wherein:
the first switch or the second switch is a mechanical apparatus, the mechanical apparatus including a relay or a power semiconductor device including a metal-oxide-semiconductor field-effect transistor (MOSFET).

10. The energy storage circuit according to claim 1, further including:
a first current detector between a positive electrode of a first capacitor and a drain electrode of the first power semiconductor device, configured to detect a primary-side current;
a second current detector between a positive electrode of a second capacitor and a drain electrode of the seventh power semiconductor device, configured to detect a secondary-side current; and
a third current detector, configured to detect a grid current, wherein each of the first current detector, the second current detector and the third current detector is a Hall effect sensor, a shunt or a current transformer.

11. An energy storage circuit, comprising:
a DC/DC circuit, including a primary side and a secondary side which are connected through a transformer, wherein the primary side of the DC/DC circuit includes a first voltage detector configured to measure a primary-side voltage; and the secondary side of the DC/DC circuit includes a first resonant capacitor, a power inductor, a first switch crossing the first resonant capacitor, a second switch crossing the power inductor, and a second voltage detector configured to measure a secondary-side voltage;
at least one AC/DC circuit electrically connected to the DC/DC circuit; and
a grid power relay, and a processor, wherein:
in response to an on-grid state being detected, the processor is configured to turn on the first switch for conduction and turn off the second switch for disconnection and generate waves using a dual active bridge (DAB) topology mode; and
in response to an off-grid state being detected, the processor is configured to turn off the first switch for disconnection and turn on the second switch for conduction and generate waves using a resonant topology mode.

12. The energy storage circuit according to claim 11, further including:
a plurality of power semiconductor devices in the DC/DC circuit, wherein the plurality of power semiconductor devices includes:
a first power semiconductor device, a second power semiconductor device, a third power semiconductor device, and a fourth power semiconductor device at the primary side of the DC/DC circuit; and
a fifth power semiconductor device, a sixth power semiconductor device, a seventh power semiconductor device and an eighth power semiconductor device at the secondary side of the DC/DC circuit, wherein:
a first terminal of the first switch is electrically connected to a first terminal of the first resonant capacitor, and one tap of the transformer; and a second terminal of the first switch is electrically connected to each of a second terminal of the first resonant capacitor, a source electrode of the fifth power semiconductor device and a drain electrode of the sixth power semiconductor device; and
a first terminal of the second switch is electrically connected to a first terminal of the power inductor; and a second terminal of the second switch is electrically connected to each of a second terminal of the power inductor, a source electrode of the seventh power semiconductor device and a drain electrode of the eighth power semiconductor device.

13. The energy storage circuit according to claim 12, further including:
a resonant inductor connected in series with the power inductor, wherein the first terminal of the second switch is connected to a second terminal of the resonant inductor.

14. A control method of an energy storage circuit, wherein the energy storage circuit includes a DC/DC circuit, including a primary side and a secondary side which are connected through a transformer, wherein the primary side of the DC/DC circuit includes a first voltage detector configured to measure a primary-side voltage; and the secondary side of the DC/DC circuit includes a first resonant capacitor, a power inductor, a first switch crossing the first resonant capacitor, a second switch crossing the power inductor and a third switch connected in series with the power inductor, and a second voltage detector configured to measure a secondary-side voltage; at least one AC/DC circuit electrically connected between the DC/DC circuit and an electrical grid; and a third grid voltage detector configured to measure a grid voltage and detect an on-grid state or an off-grid state; a grid power relay; and a processor, the method comprising:

in response to the on-grid state being detected and the grid voltage being detected abnormal, turning off the grid power relay for disconnection and generating waves using a dual active bridge (DAB) topology mode; and in response to the off-grid state being detected and the grid voltage being detected normal, determining whether the primary-side voltage is matched with the secondary-side voltage.

15. The control method according to claim 14, wherein: the energy storage circuit further includes a plurality of power semiconductor devices in the DC/DC circuit, wherein the plurality of power semiconductor devices includes:

a first power semiconductor device, a second power semiconductor device, a third power semiconductor device and a fourth power semiconductor device at the primary side of the DC/DC circuit; and a fifth power semiconductor device, a sixth power semiconductor device, a seventh power semiconductor device and an eighth power semiconductor device at the secondary side of the DC/DC circuit, wherein:

a first terminal of the first switch is electrically connected to each of a first terminal of the first resonant capacitor, a first terminal of an excitation inductor, and one tap of the transformer; and a second terminal of the first switch is electrically connected to each of a second terminal of the first resonant capacitor, a source electrode of the fifth power semiconductor device and a drain electrode of the sixth power semiconductor device; and a first terminal of the second switch is electrically connected to a first terminal of the power inductor, and a second terminal of the second switch is electrically connected to each of a second terminal of the third switch, a source electrode of the seventh power semiconductor device and a drain electrode of the eighth power semiconductor device; and a first terminal of the third switch is electrically connected to a second terminal of the power inductor.

16. The control method according to claim 15, wherein: the energy storage circuit further includes a resonant inductor connected in series with the power inductor, wherein the first terminal of the second switch is further connected to a second terminal of the resonant inductor; and an excitation inductor configured in parallel with the transformer, wherein a first terminal of the excitation inductor is connected to each of the first terminal of the first switch and the one tap of the transformer; and a second terminal of the excitation inductor is connected to each of a first terminal of the resonant inductor and another tap of the transformer.

17. The control method according to claim 15, further including:

in response to the primary-side voltage is determined to be matched with the secondary-side voltage, generating waves using a resonant topology mode; and in response to the primary-side voltage is determined to be not matched with the secondary-side voltage, generating the waves using the DAB topology mode.

18. The control method according to claim 17, further including:

in response to the primary-side voltage is determined to be matched with the secondary-side voltage, before generating the waves using the resonant topology mode, stopping sending a wave-generating driving signal to the plurality of power semiconductor devices, turning off the first switch for disconnection, turning on the second switch for conduction, and turning off the third switch for disconnection.

19. The control method according to claim 15, further including:

in response to the on-grid state being detected and the grid voltage being detected abnormal, before generating the waves using the DAB topology mode, stopping sending a wave-generating driving signal to the plurality of power semiconductor devices, turning on the first switch for conduction, turning off the second switch for disconnection, and turning on the third switch for conduction.

20. The control method according to claim 15, further including:

in response to the on-grid state being detected and the grid voltage being detected normal:

when V2+Vth1<V1*N<V2+Vth2, wherein V1 denotes the primary-side voltage, V2 denotes the secondary-side voltage, Vth1 denotes a first voltage deviation, Vth2 denotes a second voltage deviation and N denotes a transformation ratio of the transformer, turning off the first switch and the third switch for disconnection, turning on the second switch for conduction, and generating waves using a resonant topology mode; and when V1*N<V2+Vth1 or V1*N>V2+Vth2, stopping sending a wave-generating driving signal to the plurality of power semiconductor devices, turning on the first switch for conduction, turning off the third switch for disconnection, turning on the third switch for conduction, and generating the waves using the DAB topology mode.

* * * * *